United States Patent
Manning et al.

(10) Patent No.: US 12,032,705 B1
(45) Date of Patent: Jul. 9, 2024

(54) DETECTING AN OPERATIONAL STATE OF ANTIVIRUS SOFTWARE

(71) Applicant: Trend Micro Incorporated, Tokyo (JP)

(72) Inventors: Todd Joseph Kalauhala Manning, Austin, TX (US); Muqeet Ali, Austin, TX (US); Jonathan Edward Andersson, Round Rock, TX (US); Josiah Dede Hagen, Round Rock, TX (US); Richard Andrew Lawshae, Austin, TX (US); Haoping Liu, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 414 days.

(21) Appl. No.: 17/518,955

(22) Filed: Nov. 4, 2021

Related U.S. Application Data

(60) Provisional application No. 63/234,932, filed on Aug. 19, 2021.

(51) Int. Cl.
*G06F 21/00* (2013.01)
*G06F 21/56* (2013.01)
*G06F 21/57* (2013.01)

(52) U.S. Cl.
CPC .......... *G06F 21/577* (2013.01); *G06F 21/564* (2013.01); *G06F 2221/033* (2013.01)

(58) Field of Classification Search
CPC .............................. G06F 21/564; G06F 21/577
See application file for complete search history.

(56) References Cited

U.S. PATENT DOCUMENTS

| | | | |
|---|---|---|---|
| 7,231,637 B1* | 6/2007 | McEwan ................. | G06F 21/56 717/171 |
| 2006/0123481 A1* | 6/2006 | Bhatnagar ............. | H04L 63/164 726/24 |
| 2008/0229149 A1* | 9/2008 | Penton ................... | G06F 21/577 714/30 |

OTHER PUBLICATIONS

Wikipedia—Forward secrecy, 6 sheets [retrieved on Sep. 14, 2021], retrieved from the internet: https://en.wikipedia.org/wiki/Forward_secrecy.

* cited by examiner

*Primary Examiner* — Jeffrey C Pwu
*Assistant Examiner* — Thong P Truong
(74) *Attorney, Agent, or Firm* — Beyer Law Group LLP

(57) ABSTRACT

Proper functioning of an antivirus software running on an endpoint system is detected using a test data that is provided to the endpoint system. The test data is also provided to a backend system, which provides the endpoint system with an antivirus definition that includes information for detecting the test data. The antivirus software running on the endpoint system scans for the test data and reports detection of the test data to the backend system. The antivirus software is deemed to have failed the proper functioning test when the antivirus software fails to report detection of the test data. Proper functioning of the antivirus software is also detected by performing a challenge procedure, which involves sending a challenge message to the endpoint system. The endpoint system is expected to respond to the challenge message with a response that includes expected information.

3 Claims, 7 Drawing Sheets

DETECTING AN OPERATIONAL STATE OF ANTIVIRUS SOFTWARE

BACKGROUND OF THE INVENTION

1. Field of the Invention

The present invention is directed to cybersecurity and more particularly to antivirus software.

2. Description of the Background Art

Antivirus software ("antivirus") is installed in many computer systems as a protective measure against malicious code. Malicious code may infect files, encrypt files, steal confidential information, open backdoors, or perform other malicious actions in a computer system. As part of its function, the antivirus scans data storage locations, such as storage devices and main memory, for data indicative of malicious code.

It is critical that the antivirus remains operational at all times. Cybersecurity vendors have agreed to the use of the so-called "EICAR file" for checking the operational status of an antivirus. The EICAR file, which contains a test string that is not inherently malicious, is deployed in a computer system that is protected by an antivirus. To check the functionality of the antivirus, the antivirus scans the computer system for data that includes the test string. A problem with using the EICAR file is that the test string is well-known, giving attackers an opportunity to circumvent tests involving the EICAR file.

SUMMARY

In one embodiment, an operational state of an antivirus software running on an endpoint system is detected by performing a proper functioning test, which involves providing a unique test data to the endpoint system. The test data is also provided to a backend system, which provides the endpoint system with an antivirus definition that includes information for detecting the test data. The antivirus software running on the endpoint system scans for the test data and reports detection of the test data to the backend system. The antivirus software is deemed to have passed the proper functioning test, i.e., operational, when the antivirus software reports detection of the test data. Otherwise, the antivirus software is deemed to have failed the proper functioning test when the antivirus software fails to report detection of the test data within a predetermined time.

The operational state of the antivirus software may also be detected by performing a challenge procedure, which involves sending a challenge message to an endpoint system, with the endpoint system being expected to respond to the challenge message with a response that includes expected information. Mass failure of antivirus software is detected when a threshold number of endpoint systems fail to correctly respond to the challenge message.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
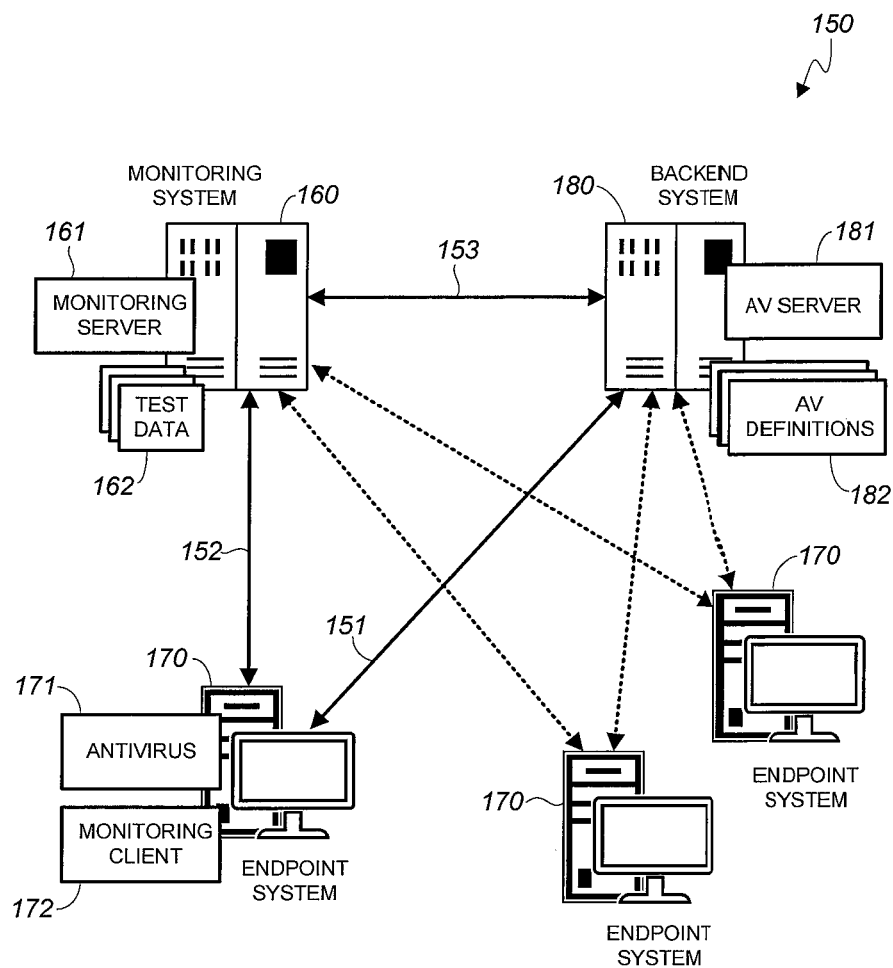
FIG. 1 shows a logical diagram of a system for detecting an operational state of an antivirus software in accordance with an embodiment of the present invention.

FIG. 1 shows a logical diagram of a system 150 for detecting an operational state of an antivirus software ("antivirus) in accordance with an embodiment of the present invention. For purposes of the present disclosure, an antivirus is operational when it functions in accordance with its design, including detecting data described in associated antivirus definitions. An antivirus is not operational when it stops working or otherwise cannot perform scanning to detect malicious code. An antivirus may become nonoperational because of malware (i.e., malicious code), system malfunction, antivirus process termination, and/or other reasons. In one embodiment, an antivirus is deemed to be operational when it can detect test data as described below; otherwise, when the antivirus cannot detect the test data, the antivirus is deemed to be nonoperational.

In the example of FIG. 1, the system 150 includes a monitoring system 160, a backend system 180, and one or more endpoint systems 170. The monitoring system 160, the backend system 180, and the one or more endpoint systems 170 communicate over a computer network, which may include the Internet.

An endpoint system 170 may be a desktop, laptop, server computer, or other computing device that hosts an antivirus software. In the example of FIG. 1, an endpoint system 170 includes an antivirus 171 and a monitoring client 172, each of which comprises instructions stored in a main memory of the endpoint system 170 that when executed by at least one processor of the endpoint system 170 cause the endpoint system 170 to operate as described herein. An endpoint system 170 is an "endpoint" in that antivirus operations are performed by the antivirus 171 at the endpoint system 170. An antivirus operation may include scanning volatile (e.g., main memory) and non-volatile (e.g., data storage devices) memory of the endpoint system 170 or other computer that is logically accessible from the endpoint system 170 for malicious code.

In the example of FIG. 1, an antivirus 171 performs antivirus scanning in conjunction with one or more antivirus definitions 182. An antivirus definition 182 may comprise signatures, patterns, rules, models, and/or other information for detecting malicious code. The antivirus 171 may scan files, memory locations, etc. for presence of malicious code indicated in an antivirus definition 182 by pattern matching or other conventional antivirus algorithm. An endpoint system 170 communicates with the backend server 180 (see arrow 151) to receive the antivirus definitions 182 and to coordinate antivirus operations with the backend system 180.

An endpoint system 170 communicates with the monitoring system 160 (see arrow 152) to receive a unique test data 162, which the antivirus 171 on the endpoint system 170 is expected to detect and report to the backend system 180 as part of a proper functioning test. A proper functioning test is a test to determine whether or not an antivirus 171 is operational. The backend system 180 communicates with the monitoring system 160 (see arrow 153) to receive the same test data 162. Information for detecting the test data 162 is incorporated in an antivirus definition 182 that is provided by the backend system 180 to the endpoint system 170 as part of the proper functioning test. The backend system 180 communicates with the monitoring system 160 to verify detection of the test data 162 by the antivirus 171 in the endpoint system 170.

A test data 162 may comprise predetermined data, such as binary data, a fixed-length string of American Standard Code for Information Interchange (ASCII) characters, or other type of data that is detectable with an antivirus definition. The test data 162 is not malicious but will be detected as malware (i.e., malicious code) by an antivirus 171 in accordance with a corresponding AV definition 182. In one embodiment, the proper functioning test follows forward secrecy principles by generating a unique test data 162 for each endpoint system 170 and for each round of proper functioning test. A round of proper functioning test may be identified by a timestamp, such as a time epoch. This advantageously makes it more difficult for an attacker to acquire a test data 162 and exploit it as part of a subsequent cyberattack. A proper functioning test may be performed periodically.

An antivirus 171 in an endpoint system 170 is deemed to have failed the proper functioning test when the antivirus 171 fails to report detection of a test data 162 that has been provided to the endpoint system 170. A monitoring client 172 in the endpoint system 170 works in conjunction with a monitoring server 161 hosted by the monitoring system 160 to perform the proper functioning test. Advantageously, the system 150 does not have a single point of failure in that an attacker would have to compromise multiple systems to circumvent the proper functioning test.

The monitoring system 160 may comprise one or more server computers or other computing devices. In the example of FIG. 1, the monitoring system 160 includes the monitoring server 161, which comprises instructions stored in a main memory of the monitoring system 160 that when executed by at least one processor of the monitoring system 160 cause the monitoring system 160 to operate as described herein.

In the example of FIG. 1, the monitoring server 161 communicates with a monitoring client 172 in an endpoint system 170 to provide a test data 162 and to receive status of a proper functioning test involving the test data 162. The monitoring server 161 expects the test data 162 to be detected by the antivirus 171 in the endpoint system 170. The monitoring server 161 communicates with the antivirus server 181 to verify detection of the test data 162 in the endpoint system 170. The monitoring server 161 may deem the antivirus 171 to have failed the proper functioning test when the antivirus 171 fails to report detection of the test data 162 within a predetermined time.

The backend system 180 may comprise one or more server computers or other computing devices. In the example of FIG. 1, the backend system 180 hosts the antivirus server 181, which comprises instructions stored in a main memory of the backend system 180 that when executed by at least one processor of the backend system 180 cause the backend system 180 to operate as described herein. The antivirus server 181 communicates with an antivirus 171 to provide one or more antivirus definitions 182 and to receive reports of detection events, i.e., the antivirus 171 detecting malicious code.

As part of a proper functioning test involving a test data 162, an antivirus definition 182 incorporates information for detecting the test data 162. When the antivirus 171 detects data that matches the test data 162 in accordance with the antivirus definition 182, the antivirus 171 declares detection of malicious code. The antivirus 171 sends the antivirus server 181 a report of the malicious code detection, with the report indicating the antivirus definition 182 that triggered the detection. This allows the antivirus server 181 to verify that the antivirus 171 correctly detected the test data 162 and is thus operational.

The components of the system 150 may employ conventional secure communication schemes, such as Public Key Infrastructure (PKI), symmetric encryption, digital signatures, etc. to secure communications and to validate data transmitted between them. The system 150 may incorporate forward secrecy principles for enhanced security. For example, the components of the system 150 may negotiate and use a different session key for each session. As another example, the components of the system 150 may communicate using a multi-key approach. In such an approach, two or more keys are required to successfully decrypt communication. These keys may be generated by different components of the system 150. More particularly, for a two-key approach, one key may be generated by the monitoring system 160 and the other by the backend system 180. The keys are then distributed to the respective components, and new keys are generated periodically. Advantageously, the multi-key approach substantially increases the cost of the attacker to compromise the keying infrastructure. With the use of such multi-key approach, both the backend system 180 and monitoring system 160 would need to be compromised in order to break the keying infrastructure.

Figure 2:
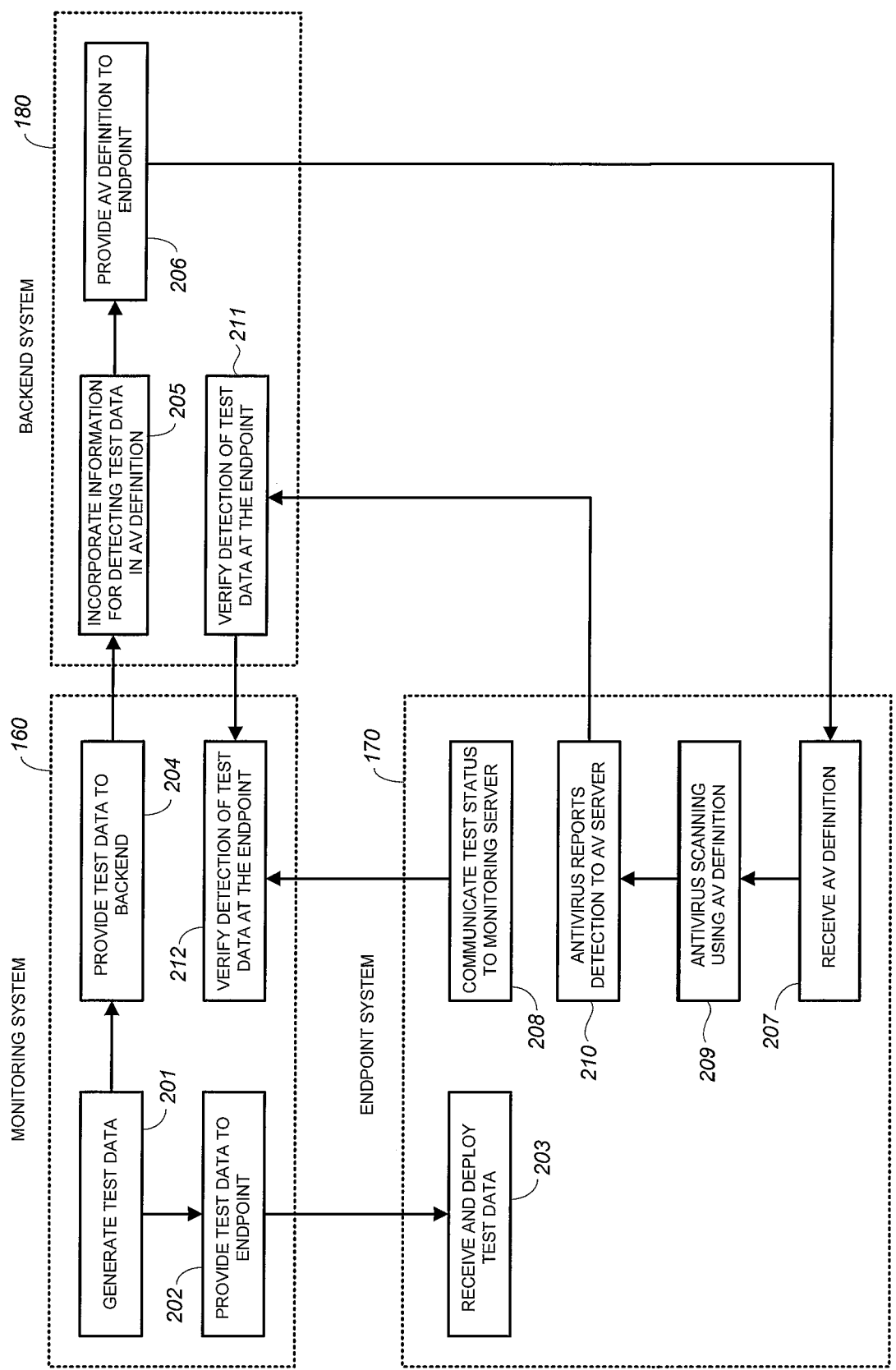
FIG. 2 shows a flow diagram of a method of detecting an operational state of an antivirus software in accordance with an embodiment of the present invention.

FIG. 2 shows a flow diagram of a method of detecting an operational state of an antivirus software in accordance with an embodiment of the present invention. The method of FIG. 2 may be performed using the components of the system 150 (see FIG. 1). The method of FIG. 2 is explained in the context of a single endpoint system 170.

As can be appreciated, the method of FIG. 2 is applicable to multiple endpoint systems 170.

In the example of FIG. 2, a test data 162 is generated and stored in the monitoring system 160 (step 201). The test data 162 is provided to a corresponding endpoint system 170 that will be the subject of a proper functioning test (step 202). Each endpoint system 170 receives a test data 162 that is unique to that endpoint system 170 and round of proper functioning test. Having a unique test data 162 per endpoint system 170 and per round of proper functioning test make it very difficult to circumvent the proper functioning test, as an attacker targeting an endpoint would have to get the test data for that endpoint for that time epoch.

Continuing the example of FIG. 2, the endpoint system 170 receives from the monitoring system 160 the test data 162 and places the test data 162 in a predetermined location in the endpoint system 170 or other location accessible by an antivirus 171 from the endpoint system 170 (step 203). The identifier of the test data 162, when to deploy the test data 162, and where to deploy the test data 162 may be indicated in an endpoint test configuration that is sent along with the test data 162. The test data 162 may be in the form of a file to be stored in a particular file path or data loaded in main memory, for example.

The monitoring system 160 provides the same unique test data 162 to the endpoint system 170 (at step 202) and the backend system 180 (step 204). In the backend system 180, information for detecting the test data 162 is incorporated in an antivirus definition 182 (step 205). For example, the antivirus definition 182 may include patterns (e.g., regular expressions) for matching the test data 162 and/or rules for detecting the test data 162. The antivirus definition 182 may be generated automatically or manually using conventional methods employed in the cybersecurity industry. The backend system 180 provides the antivirus definition 182 to the endpoint system 170 (step 206).

The endpoint system 170 receives the test data 162 from the monitoring system 160 (at step 203) and also receives the corresponding antivirus definition 182 from the backend system 180 (step 207). The monitoring client 172 in the endpoint system 170 monitors the status of the proper functioning test involving the antivirus 171 and communicates the status to the monitoring system 160 (step 208). The test status may indicate when the test data 162 was deployed, where the test data 162 was deployed, and the identifier of the test data 162. The antivirus 171 scans a plurality of data accessible from the endpoint system 170 using its antivirus definitions 182, which include the antivirus definition 182 for detecting the test data 162 (step 209). In this example, the antivirus 171 detects the test data 162 and reports the detection of the test data 162 to the antivirus server 181 in the backend system 180 (step 210).

The antivirus server 181 running on the backend system 180 (at step 211) and the monitoring server 161 running on the monitoring system 160 (at step 212) verify the detection of the test data 162 at the endpoint system 170. More particularly, the antivirus server 181 reports to the monitoring server 161 that the antivirus 171 at the endpoint system 170 detected the test data 162, including the particulars of the detection, such as the identifier of the test data 162, where the test data 162 was detected, and when the test data 162 was detected. The monitoring server 161 confirms that the test data 162 detected by the antivirus 171 is the unique test data provided to the endpoint system 170 for purposes of the proper functioning test for this time epoch.

In the example of FIG. 2, the endpoint system 170 is deemed to have passed the proper functioning test, and is thus operational, because the test data 162 was detected by the antivirus 171 within a predetermined time. Otherwise, the endpoint system 170 is deemed to have failed the proper functioning test in the case where the antivirus 171 fails to report detection of the test data 162 within the predetermined time. The predetermined time may be based on when the test data is detected or when detection of the test data 162 is reported by the antivirus 171.

Figure 3:
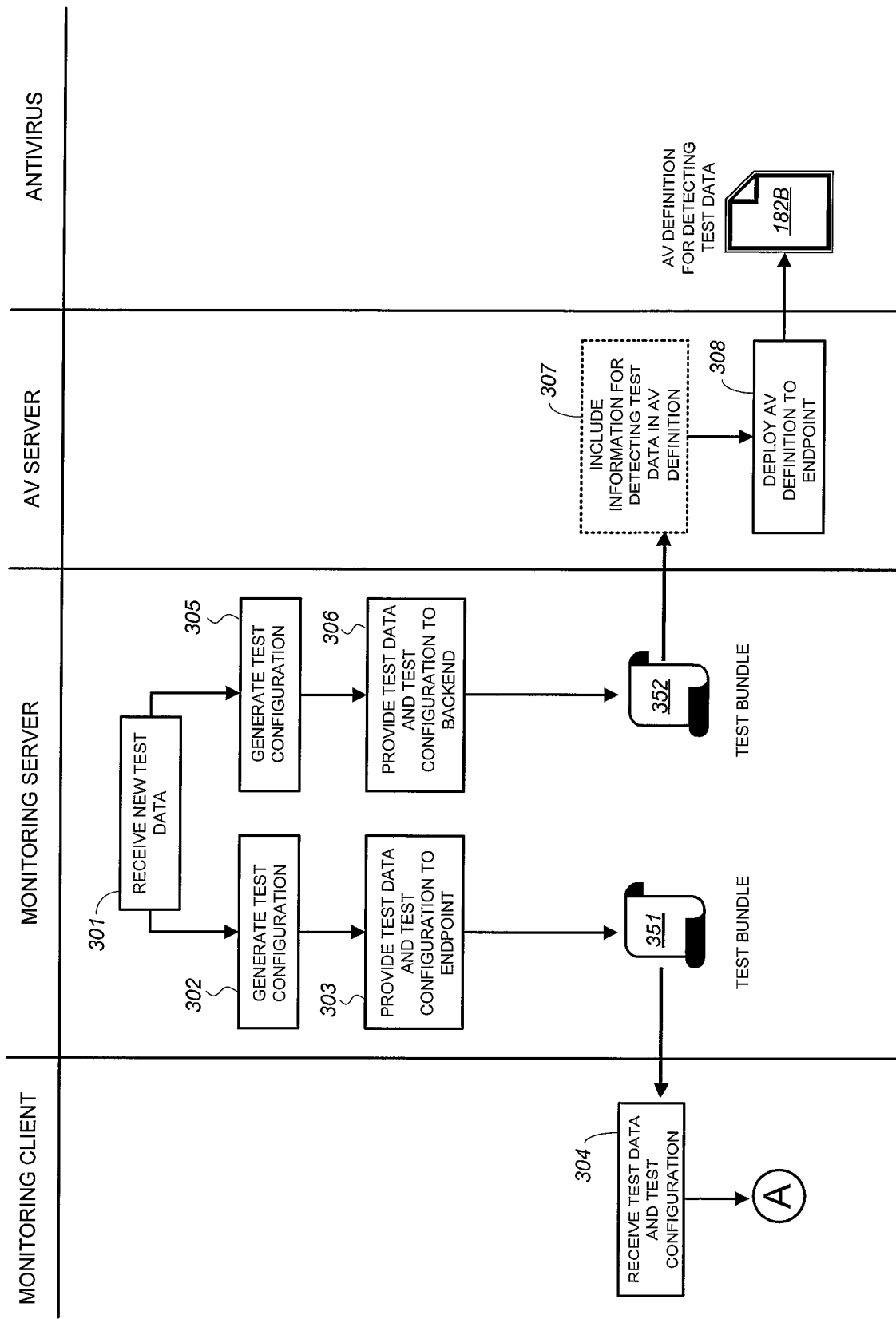
FIGS. 3-5 show a call diagram of a method of detecting an operational state of an antivirus software in accordance with an embodiment of the present invention.
Figure 4:
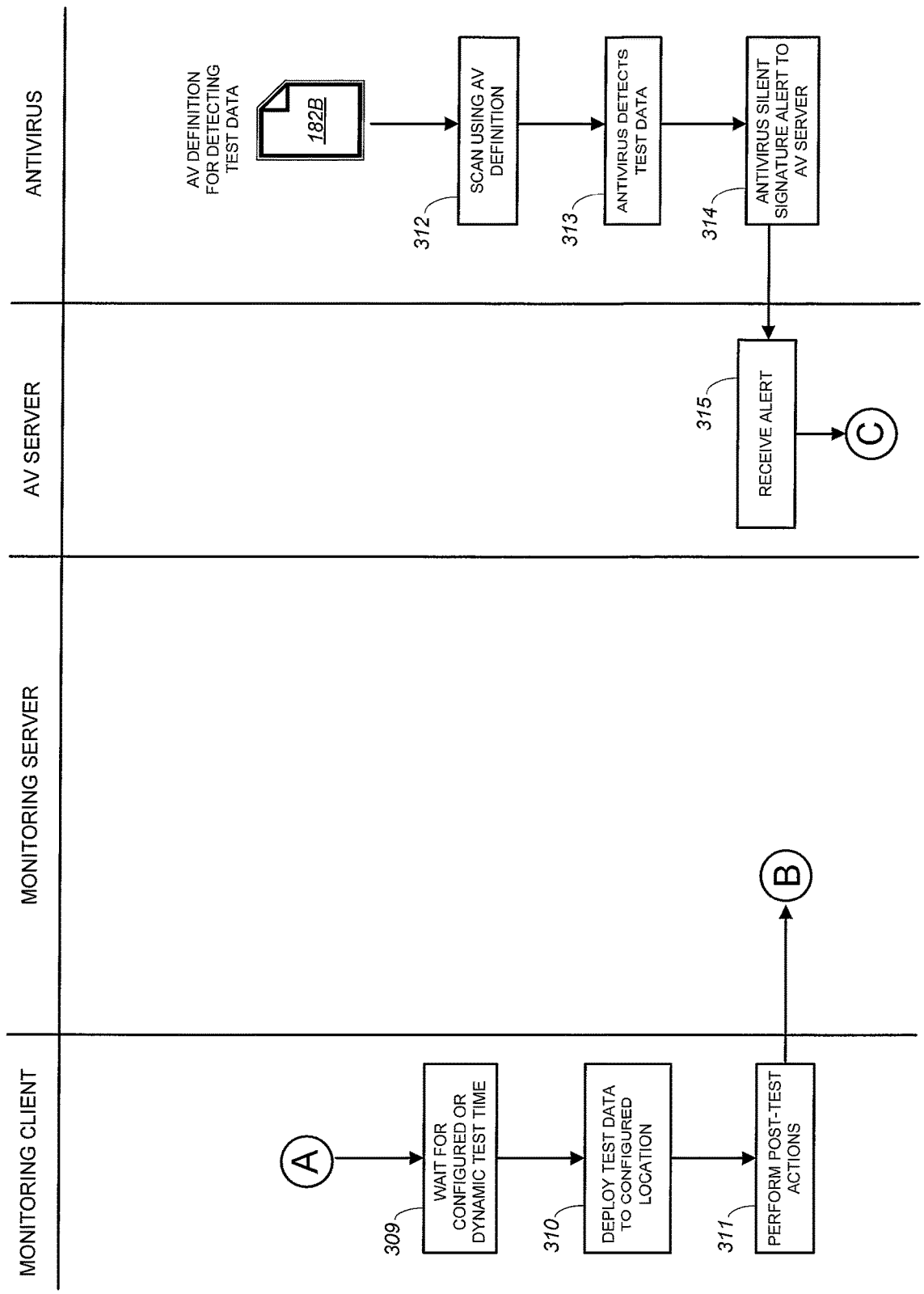
Figure 5:
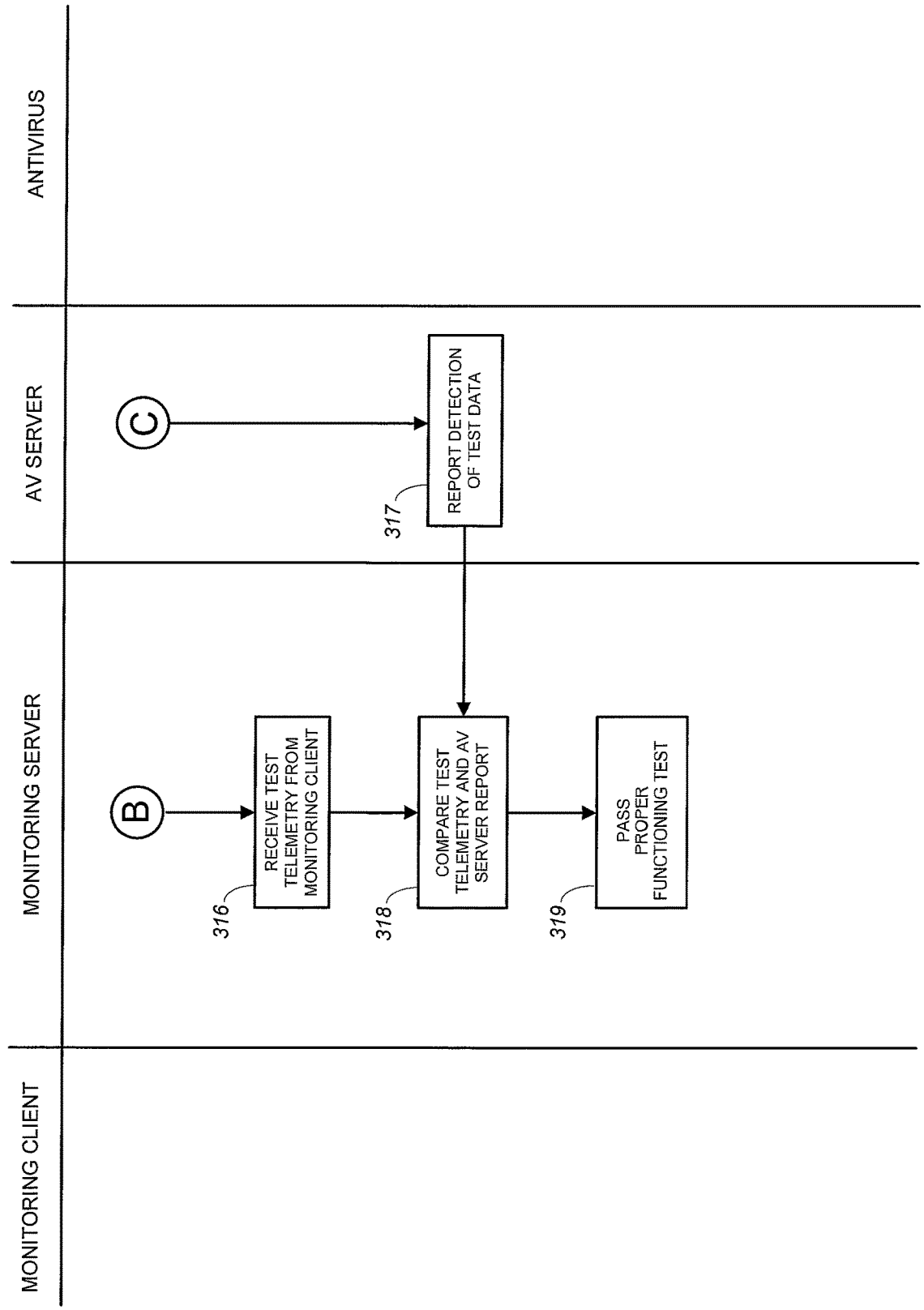

FIGS. 3-5 show a call diagram of a method of detecting an operational state of an antivirus software in accordance with an embodiment of the present invention. The method of FIGS. 3-5 is explained using the monitoring client 172, monitoring server 161, antivirus server 181, and antivirus 171 for illustration purposes only. As can be appreciated, the method of FIGS. 3-5 may also be performed using other components.

Starting with FIG. 3, the monitoring server 161 receives a new test data 162 for performing a proper functioning test (step 301) to determine an operational state of an antivirus 171 running on an endpoint system 170. The test data 162 is unique to the endpoint system 170 and for that time epoch. An endpoint test configuration is generated for the test data 162 (step 302). The endpoint test configuration may indicate an identifier of the endpoint system 170, where the test data 162 is to be deployed, when the test data 162 will be deployed, an identifier of the test data 162, and/or other information regarding the proper functioning test. The monitoring server 161 provides to the endpoint system 170 a test bundle 351 that includes the test data 162 and its corresponding endpoint test configuration (step 303). In the endpoint system 170, the monitoring client 172 receives and validates the test bundle 351 (step 304).

Similarly, a backend test configuration is generated for the test data 162 (step 305). The backend test configuration may indicate an identifier of the endpoint system 170, where the test data 162 is to be deployed, when the test data 162 will be deployed, an identifier of the test data 162, and/or other information regarding the proper functioning test. The monitoring server 161 provides to the backend system 180 a test bundle 352 that includes the test data 162 and its corresponding backend test configuration (step 306). In the backend system 180, information for detecting the test data 162 is incorporated in an antivirus definition 182B (step 307). The antivirus server 181 provides the antivirus definition 182B to the endpoint system 170 (step 308).

Continuing in FIG. 4, the endpoint test configuration may include a configured (e.g., a particular time) or dynamic (e.g., triggered by a condition) test time for performing the proper functioning test. In the endpoint system 170, the monitoring client 172 waits for the test time to occur (step 309). At the test time, the monitoring client 172 deploys the test data 162 to its configured location (e.g., designated file path) indicated in the endpoint test configuration (step 310). In one embodiment, the test data 162 is in an encrypted state prior to the test time and decrypted by the monitoring client 172 just before the test time for enhanced security.

The monitoring client 172 performs post-test actions after deploying the test data 162 (step 311). The post-test actions may include providing test telemetry to the monitoring server 161. The test telemetry may include the identifier of the endpoint system 170, the identifier of the antivirus 171, where the test data 162 was deployed (e.g., file path), when the test data 162 was deployed, etc.

Still referring to FIG. 4, the antivirus 171 receives the AV definition 182B from the antivirus server 181 and includes the AV definition 182B in the plurality of AV definitions 182 that the antivirus 171 employs to scan files and other data for malicious code (step 312). The antivirus 171 detects the test data 162 indicated in the AV definition 182B during the scanning (step 313). The antivirus 171 reports the detection of the test data 162 to the antivirus server 181 (step 314). The AV definition 182B may include instructions to report the detection as part of a silent signature alert, which involves reporting the detection in a digitally signed encrypted package without alerting the administrator or user of the endpoint system 170. This advantageously allows the proper functioning test to be performed with minimal or no impact to normal operations of the endpoint system 170.

The antivirus server 181 receives the alert (step 315), which includes a detection report from the antivirus 171.

The detection report from the antivirus 171 may indicate an identifier of the AV definition 182B that triggered the detection, the identifier of the endpoint system 170, the identifier of the antivirus 171, location where the test data 162 was detected, timestamp of when the test data 162 was detected, and other information that allows the antivirus server 181 to verify that the test data 162 was detected.

Continuing in FIG. 5, the monitoring server 161 receives the test telemetry from the monitoring client 172 (step 316). The antivirus server 181 reports to the monitoring server 161 the detection of the test data 162 in the endpoint system 170 (step 317). The report from the antivirus server 181 may include the identifier of the test data 162 defined by the AV definition 182B and information from the detection report of the antivirus 171.

The monitoring server 161 compares information from the test telemetry received from the monitoring client 172 against information from the report from the antivirus server 181 (step 318). For example, the monitoring server 161 may check to ensure that the test telemetry and the report have consistent information as to the identifier of the test data 162, the endpoint 170 where the test data 162 was deployed, the file path where the test data 162 was detected, etc. The antivirus 171 is deemed to have passed the proper functioning test when the antivirus 171 reports detection of the test data 162 within a predetermined time (step 319).

In the example of FIGS. 3-5, the illustrated steps lead to a successful proper functioning test. As can be appreciated, when the antivirus 171 fails to detect the test data 162 within the predetermined time, the antivirus 171 will not be able to report detection of the test data 162 to the antivirus server 181. In that case, the antivirus 171 is deemed to have failed the proper functioning test. One or more response actions may be performed in the event of a failed proper functioning test, including raising an alert to notify an administrator.

Figure 6:
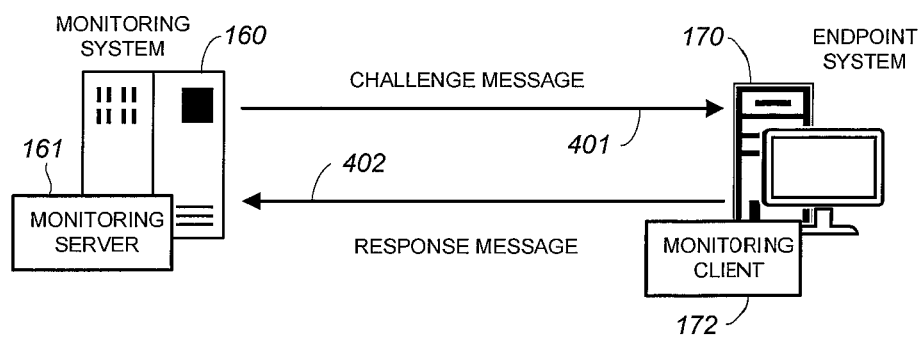
FIG. 6 shows a logical diagram of the system of FIG. 1 performing a challenge procedure to detect an operational state of an antivirus software in accordance with an embodiment of the present invention.

FIG. 6 shows a logical diagram of the system 150 performing a challenge procedure in accordance with an embodiment of the present invention. A mass failure of a plurality of antivirus 171 occurs when a threshold number of antivirus 171 becomes nonoperational. A mass failure of antivirus 171 indicates a coordinated cyberattack, a major bug or failure of the cybersecurity infrastructure, or some other critical systemic issue. Mass failure of antivirus 171 may be detected by performing the above-described proper functioning test on many different endpoint systems 170.

Another way to detect a mass failure of antivirus 171 is to perform a challenge procedure with each of a plurality of endpoint systems 170. More specifically, as shown in FIG. 6, the monitoring server 161 may send a challenge message (see arrow 401) to a monitoring client 172 in an endpoint system 170. The monitoring server 161 expects the monitoring client 172 to respond to the challenge message by sending a response message (see arrow 402) that includes information indicative of a properly functioning antivirus 171 in the endpoint system 170. The communications between the monitoring server 161 and the monitoring client 172 may be secured cryptographically.

In the example of FIG. 6, the monitoring server 161 expects the monitoring client 172 to respond with an expected information, such as a hash value of one or more essential files of the antivirus 171 and/or process information of the antivirus 171. Otherwise, the monitoring server may deem a single antivirus 171 to be nonoperational. The monitoring server 161 detects an enterprise-wide failure of the antivirus 171 when a threshold number of endpoint systems 170 fail the challenge procedure.

The system 150 may incorporate various ways of minimizing false alarms. For example, whitelisting methods may be employed to accommodate known and scheduled offline events, such as network maintenance, power outages, vacation hours, etc. More particularly, affected endpoints may be whitelisted so that they will not be the subject of proper functioning tests or challenge procedures during the scheduled events.

Another way of minimizing false alarms is to model the behavior of a user of an endpoint to predict conditions when the endpoint is operational, but its antivirus is not. For example, a user's network or application activity may be tracked to determine if the user is employing the endpoint. If the endpoint is not responding to challenges but the endpoint behavior is not consistent with being offline, then proper functioning of the antivirus may be predicted more reliably.

The class of an endpoint may also be taken into consideration to minimize false alarms. For example, some endpoints like server computers may be considered as permanent classes while some endpoints like laptops or other mobile devices may be considered as transient classes. The class of an endpoint may be considered to prioritize response actions or to assign severity to a detected unsuccessful proper functioning test or challenge test. For example, the failure of a server computer to respond to challenges may have much more significance than that of a laptop, because a laptop may simply be offline.

Figure 7:
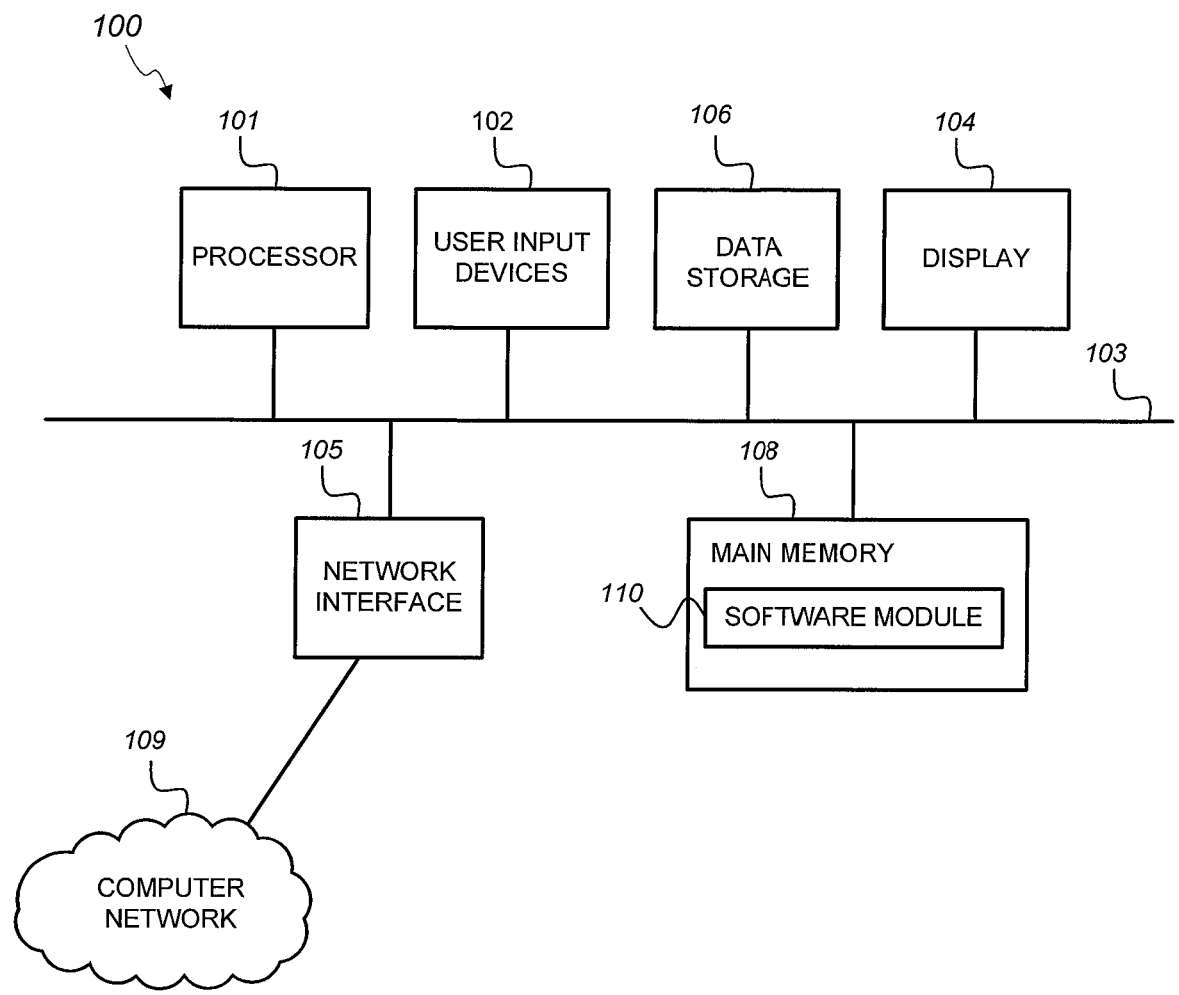
FIG. 7 shows a logical diagram of a computer system that may be employed with embodiments of the present invention.

Referring now to FIG. 7, there is shown a logical diagram of a computer system 100 that may be employed with embodiments of the present invention. The computer system 100 may be employed as a monitoring system, a backend system, or an endpoint system. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

The software modules 110 may comprise a monitoring client and an antivirus when the computer system 100 is configured as an endpoint system, a monitoring server when the computer system 100 is configured as a monitoring system, or an antivirus server when the computer system 100 is configured as a backend system.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for detecting proper functioning of an antivirus software, the system comprising:

a monitoring system comprising a memory and at least one processor, the memory of the monitoring system storing instructions that when executed by the at least one processor of the monitoring system cause the monitoring system to:

provide to an endpoint system over a computer network a test data for performing a round of a proper functioning test to determine if an antivirus software running on the endpoint system is operational, the test data being unique to the endpoint system and the round of the proper functioning test;

receive from the endpoint system over the computer network a status of the proper functioning test;

receive a report from a backend system indicating detection of the test data by the antivirus software;

receive test telemetry of the proper functioning test from the endpoint system;

compare information in the report to information in the test telemetry; and deem the antivirus software to be operational when the information in the report is consistent with the information in the test telemetry;

the backend system comprising a memory and at least one processor, the memory of the backend system storing instructions that when executed by the at least one processor of the backend system cause the backend system to:

receive the test data from the monitoring system over the computer network; and provide to the endpoint system an antivirus definition that includes information for detecting the test data; and the endpoint system comprising a memory and at least one processor, the memory of the endpoint system storing instructions that when executed by the at least one processor of the endpoint system cause the endpoint system to:

receive the test data over the computer network;

receive the antivirus definition over the computer network;

scan a plurality of data using the antivirus software and the antivirus definition to look for the test data;

detect the test data using the antivirus software and the antivirus definition; and report detection of the test data to the backend system.

2. A system for detecting proper functioning of an antivirus software, the system comprising:

a monitoring system comprising a memory and at least one processor, the memory of the monitoring system storing instructions that when executed by the at least one processor of the monitoring system cause the monitoring system to:

provide to an endpoint system over a computer network a test data for performing a round of a proper functioning test to determine if an antivirus software running on the endpoint system is operational, the test data being unique to the endpoint system and the round of the proper functioning test;

receive from the endpoint system over the computer network a status of the proper functioning test;

send a challenge message to the endpoint system; and detect that the antivirus software is operational when the endpoint system responds with a response message that includes an expected information;

a backend system comprising a memory and at least one processor, the memory of the backend system storing instructions that when executed by the at least one processor of the backend system cause the backend system to:

receive the test data from the monitoring system over the computer network; and provide to the endpoint system an antivirus definition that includes information for detecting the test data; and the endpoint system comprising a memory and at least one processor, the memory of the endpoint system storing instructions that when executed by the at least one processor of the endpoint system cause the endpoint system to:

receive the test data over the computer network;

receive the antivirus definition over the computer network;

scan a plurality of data using the antivirus software and the antivirus definition to look for the test data;

detect the test data using the antivirus software and the antivirus definition; and report detection of the test data to the backend system.

3. The system of claim 2, wherein the expected information includes a hash value of a file or a process information of the antivirus software.

* * * * *